US012710091B2

(12) United States Patent
Garrett et al.

(10) Patent No.: US 12,710,091 B2
(45) Date of Patent: Aug. 18, 2026

(54) HYBRID MATERIAL ROTATIONAL SYSTEMS AND METHODS OF MANUFACTURING

(71) Applicant: Amorphology Inc., Pasadena, CA (US)

(72) Inventors: Glenn R. Garrett, Pasadena, CA (US); Douglas J. Peters, Pasadena, CA (US)

(73) Assignee: Amorphology Inc., Pasadena, CA (US)

( * ) Notice: Subject to any disclaimer, the term of this patent is extended or adjusted under 35 U.S.C. 154(b) by 0 days.

(21) Appl. No.: 18/886,917

(22) Filed: Sep. 16, 2024

(65) Prior Publication Data

US 2025/0092936 A1 Mar. 20, 2025

Related U.S. Application Data

(60) Provisional application No. 63/582,933, filed on Sep. 15, 2023.

(51) Int. Cl.
*F16H 1/28* (2006.01)
*F16H 57/032* (2012.01)

(52) U.S. Cl.
CPC ............. *F16H 1/28* (2013.01); *F16H 57/032* (2013.01); *F16H 2001/2881* (2013.01)

(58) Field of Classification Search
CPC ........... F16H 1/28; F16H 57/032; F16H 55/06
See application file for complete search history.

(56) References Cited

U.S. PATENT DOCUMENTS 8,834,315 B2 * 9/2014 Sappenfield ............ F02K 3/072 475/331
10,487,934 B2 * 11/2019 Kennett ............... B22D 29/001
10,941,847 B2 * 3/2021 Hofmann ................ C22C 14/00
11,236,731 B2 * 2/2022 Ma ......................... H01R 39/24
(Continued)

FOREIGN PATENT DOCUMENTS

CN 116557500 A 8/2023
KR 20080072432 A * 8/2008 ............... F16H 1/28
WO 2025059676 A1 3/2025

OTHER PUBLICATIONS

International Search Report and Written Opinion for International Application No. PCT/US2024/046957, Search completed Jan. 23, 2025, Mailed Jan. 30, 2025, 26 pgs.
(Continued)

*Primary Examiner* — Derek D Knight
(74) *Attorney, Agent, or Firm* — KPPB LLP

(57) ABSTRACT

Rotational systems comprising multiple interconnecting rotational elements such as gears or traction rollers, and more particularly rotational systems wherein the interconnecting rotational elements are configured to operate for extended lifetimes are provided. The rotational systems may be planetary comprising a central sun element, and outer or ring elements, and two or more planet elements interconnected between the sun element and outer or ring element. Rotational elements within the systems may be formed of materials that interact to allow for extended operational lifetime and/or operation in extreme environments or without lubrication. The plurality of elements may be formed of hybrid materials with different hardness and modulus properties, including steels and bulk metallic glasses.

21 Claims, 16 Drawing Sheets

(56) References Cited

U.S. PATENT DOCUMENTS

| | | | | |
|---|---|---|---|---|
| 2014/0093674 | A1* | 4/2014 | Hofmann ................ | F16H 57/00 29/893 |
| 2015/0047463 | A1* | 2/2015 | Hofmann ................ | C22C 45/10 29/893 |
| 2016/0178047 | A1 | 6/2016 | Kennett et al. | |
| 2019/0136962 | A1* | 5/2019 | Hasan ..................... | F03D 15/00 |
| 2019/0177826 | A1 | 6/2019 | Hofmann et al. | |
| 2021/0254699 | A1 | 8/2021 | Hofmann et al. | |

OTHER PUBLICATIONS

International Preliminary Report on Patentability for International Application No. PCT/US2024/046957, Report issued Mar. 17, 2026, Mailed Mar. 26, 2026, 12 pgs.

Hofmann et al., "Optimizing Bulk Metallic Glasses for Robust, Highly Wear-Resistant Gears", Advanced Engineering Materials, vol. 19, No. 1, Article 1600541, 2016, 10 pgs., doi: 10.1002/adem.201600541.

* cited by examiner

PRIOR ART

PRIOR ART

FIG. 7d

Left ring

Right ring

Carrier

Carrier

PRIOR ART

PRIOR ART

PRIOR ART

HYBRID MATERIAL ROTATIONAL SYSTEMS AND METHODS OF MANUFACTURING

PRIORITY STATEMENT

The current application claims priority to U.S. Provisional Application No. 63/582,933, filed Sep. 15, 2023, the entire disclosure of which is incorporated herein by reference.

FIELD OF THE INVENTION

This disclosure describes rotational systems, and more particularly gears, gearboxes and traction drives containing hybrid rotating components comprised of a combination of crystalline metal components and bulk metallic glass rotating components.

BACKGROUND OF THE INVENTION

Rotational systems, such as, gearboxes and traction drives are mechanisms that typically function to transfer energy from an input to an output, generally using an included set of interconnecting rotational elements such as gears or rollers. In many instances, these systems operate to alter input/output speed (e.g. rotational speed) and/or torque. Rotational systems can also be used to change the direction of energy transfer. One type of gearbox and traction drive is a planetary system, which is made up of three components: the sun element, several planet elements, and the outer or ring element. The system in this epicyclic system works by having one central element around which other elements rotate. The central element in the center of the planetary system is known as the "sun element". In most cases, this is the input element. The outside is made up of two or more outer elements, or "planet elements". An outer ring element surrounds the planet elements and holds the whole system together. The planetary elements are connected to each other by the planetary carrier. This planetary system is connected to the output shaft. Planet elements are in contact with the outer ring element and the sun element which creates the rotation. As the carrier keeps the planet elements in the basic form, the gaps are set.

SUMMARY OF THE DISCLOSURE

Embodiments of the disclosure are directed to rotational systems, and more particularly gears, gearboxes and traction drives containing hybrid rotating components comprised of a combination of crystalline metal components and bulk metallic glass rotating components.

Many embodiments of the disclosure may be directed to gears and gearboxes, and more particularly to gears and gearboxes comprising hybrid components comprised of a combination of crystalline metal components and bulk metallic glass components.

Various embodiments may also be directed to traction drives and traction drive components, and more particularly to traction drives and components comprises of a combination of crystalline metal rotating components and bulk metallic glass rotating components.

Many embodiments of the disclosure are directed to a device comprising, a sun element comprised of a first material with a first modulus; a plurality of planet elements comprised of a second material with a second modulus; and a ring element; wherein the sun element and the ring element are coaxial with an axis, and each of the plurality of planet elements are disposed between the sun element and the ring element; wherein the sun element and each of the plurality of planet elements engage and transfer motion therebetween at a first interface and each of the plurality of planet elements and the ring element engage at a second interface; and wherein at least one of the first material and the second material is a bulk metallic glass and the first modulus and the second modulus are unequal.

In some embodiments, the sun element wears at a rate proportional to the number of planet elements.

In some embodiments, the first material and the second material are selected so that the first modulus and the second modulus are proportional to the rate such that the sun element and each of the planet elements wear an approximately symmetric amount.

In some embodiments, the second material has a lower modulus than the first material, and the device is further configured to minimize contact stress at the first interface.

In some embodiments, the sun element and the plurality of planet elements are configured as gears with a plurality of gear teeth, and the device is further configured to balance wear on the plurality of gear teeth.

In some embodiments, the sun element has a higher hardness and modulus than each of the plurality of planet elements.

In some embodiments, further comprising a ring element and wherein the first rotational element, is configured to rotate about an axis, and the ring element is disposed coaxially with the first rotational element and the second rotational element is disposed between the first rotational element and the ring element.

In some embodiments, at least one of the first material or the second material is a steel alloy.

In some embodiments, the device is configured for operation above a set temperature.

In some embodiments, at least one of the plurality of planet elements and the sun element is further comprised of a third material at a contact surface.

In some embodiments, the third material is an oxide or a ceramic.

Numerous embodiments of the disclosure are directed to a device comprising, a first rotational element comprised of a first material with a first surface that rotates at a first speed; and a second rotational element comprised of a second material with a second surface that rotates at a second speed; wherein the first surface and the second surface are comprised of different materials and engage at a hybrid material interface to transfer motion; wherein the first rotational element rotates at a first cycle period, the second rotational element rotates at a second cycle period, and the first cycle period is different from the second cycle period; and wherein at least one of the first material and the second material is a bulk metallic glass.

In some embodiments, the first speed and the second speed are different.

In some embodiments, the first rotational element and the second rotational element are configured as gears.

In some embodiments, the first material and the second material are different.

In some embodiments, the first material and the second material are selected for a desired property selected from the group consisting of: operational lifetime, operational environment, hardness, or modulus.

In some embodiments, the first cycle period is higher than the second cycle period, and the first material is selected for a modulus that is higher than the second material.

In some embodiments, the modulus is selected for a low contact stress at the hybrid material interface.

In some embodiments, the device is configured as a traction drive.

In some embodiments, the first rotational element wears at a first wear rate, the second rotational element wears at a second wear rate and the first wear rate and the second wear rate are not equal.

In some embodiments, the modulus of the first material is selected proportional to the first wear rate and the modulus of the second material is selected proportional to the second wear rate.

In some embodiments, the device is configured such that the first rotational element and the second rotational element wear an approximately symmetric amount.

In some embodiments, the first surface and the second surface are configured to engage without lubrication.

In some embodiments, the first surface is comprised of a third material that is harder than the first material.

In some embodiments, the third material is an oxide or ceramic.

In some embodiments, the oxide is formed by heating the first rotational element to around a glass transition temperature of the first material.

Various embodiments of the disclosure are directed to a method of manufacturing a device comprising, selecting a first rotational element comprised of a first material with a first modulus; selecting a second rotational element comprised of a second material with a second modulus; wherein the first material and the second material are different, and at least one is a bulk metallic glass; arranging the first rotational element and the second rotational element to engage at an interface such that rotation of the first rotational element transfers motion to the second rotational element; and wherein the first rotational element wears at a first rate, the second rotational element wears at a second rate, and the first rotational element and the second rotational element wear an approximately symmetrical amount.

In some embodiments, the method further comprises heating the first rotational element to a glass transition temperature of the first material forming a third material on a surface of the first rotational element.

In some embodiments, the method further comprises selecting a ring element and arranging the ring element so that the ring element engages with the second rotational element and the second rotational element is disposed between the first rotational element and the ring element.

In some embodiments, either the first material or the second material is a steel alloy.

In some embodiments, the second material has a lower modulus than the first material, and the first rotational element and the second rotational element are arranged to minimize contact stress.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF DRAWINGS

These and other features and advantages of the present invention will be better understood by reference to the following detailed description when considered in conjunction with the accompanying data and figures, wherein:

FIGS. 7*a* to 7*d* provide schematic diagrams of various gear elements in accordance with the prior art.

DETAILED DISCLOSURE

Figure 1:
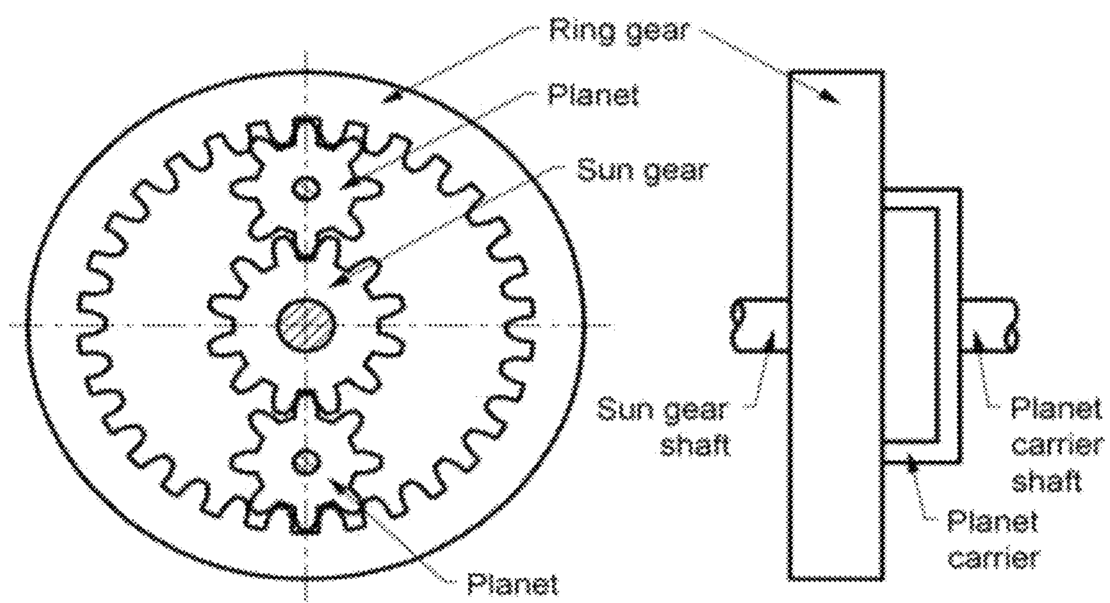
FIG. 1 provides a schematic diagram of a planetary gearbox in accordance with the prior art.

The embodiments of the invention described herein are not intended to be exhaustive or to limit the invention to precise forms disclosed. Rather, the embodiments selected for description have been chosen to enable one skilled in the art to practice the invention. All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims.

Many embodiments of the disclosure are directed to mechanical systems in which multiple rotating elements are engaged to contact each to transfer rotational motion therebetween, and more particularly to rotational systems in which at least one element is placed under greater stress during operation. Various embodiments are directed to systems where the rotational elements are gears, such as gearboxes comprising multiple interlocking gears, and more particularly to gears and gearboxes wherein the interlocking gears are configured to operate for extended lifetimes. In many embodiments the gearboxes are planetary comprising a central sun gear, and outer or ring gear, and two or more planet gears interlocked between the sun gear and outer or ring gear. In other embodiments the gears may be bevel gears, worm gears, and helical gears. Embodiments may incorporate any pair of gears that are rotating against each other in a pair where the wear strains on one gear are greater than the other. Embodiments may also be directed to non-gear rotational systems such as traction drives.

Regardless of the specific nature of the rotational elements, embodiments incorporate rotational systems where the wear on the rotational elements of the system are unequal. Embodiments then implement hybrid materials across the rotational elements to balance the wear of the elements. Various embodiments comprise gears formed of materials that are selected to allow for extended operational lifetime and/or operation in extreme environments or without lubrication. In many such embodiments, the classes of the plurality of gears are formed of materials with different hardness and modulus properties. Various embodiments implement a lower modulus material (such as, for example, a bulk metallic glasses (BMG)) in the rotational element that sees fewer cycles than its mated element, and where that mated element has a higher wear rate. In some exemplary hybrid planetary gearbox embodiments, the planet gears may be formed of lower hardness/lower modulus materials and the sun gear may be formed of higher hardness/higher modulus materials. In some such hybrid embodiments, higher hardness/high modulus materials may be steels and lower hardness/lower modulus materials may be BMGs, in yet other embodiments it will be understood that the hybrid embodiments may include all bulk metallic glasses of different hardness/modulus as long as the rotational element(s) experiencing the highest number of cycles have a higher modulus thereby lowering the contact stress between the high cycle rotational element(s) and the other low cycle rotational element(s). Embodiments are also directed to methods of manufacturing such gearboxes.

The precision gear industry typically focuses on steel gear manufacturing at scale. Within the larger industry, there are several smaller sectors focused on precision gears, including robotics, medical devices, automotive, food service industry, drones/UAVs, and aerospace, among others. Precision gear manufacturing can be both time consuming and expensive, with long lead times for some of the best-in-class and high-demand products. Within the various market segments there are a number of key drivers. The auto market is driven by a demand for lower costs and the aerospace market is driven by a need for custom, lightweight solutions. In the commercial space market, the medical robot market and the food service and food-manufacturing markets, there are performance demands such as the need to operate in cryogenic conditions and no-lubrication conditions.

Although there is interest in unlubricated gearboxes that could be used in extreme environments, unlubricated wear of conventional steel gears is very aggressive. Moreover, while the current state-of-the-art steel manufacturing methods of machining, heat treating, shot peening, superfinishing, electropolishing, and hard coating (DLC, nitriding) for steel gears allows for very high-power density transmission gears, the manufacturing lead times are very long and there are gear system applications that do not have high power density requirements. In many implementations using state of the art steel gears, and their long lead times, actually added unwanted weight and systems complexity to space platforms. The Young's modulus (~200 GPa) and Poisson's ratio (~0.30) of steel results in high gear flank contact stresses that require wet lubrication to allow the steel gear flanks to roll and slide between each other without scuffing and wear. At cryogenic temperatures, typical wet gear lubricants become extremely viscous and inoperable as a recirculating lubricant (the most common wet lubricant for space and aerospace is based on completely fluorinated oils and greases and is not rated to below −70° C., it is also sensitive to contact pressure and breaks down on the surface of steel). This requires adding system complexity, weight, and significant power draw of heating up the entire gearbox in the space environment. The alternative option to wet lubricant is using sputtered MOS as a dry lubricant, but the dry lubricant is also sensitive to contact stress and can be completely scraped off the gear flanks after a short fraction of the typical gear life.

Focusing on the specific example of space applications, operating in the conditions of planetary bodies such as comets, asteroids, Mars, the lunar surface and icy moons requires technologies that can function in wide temperature ranges (including cryogenically), have low-density to reduce spacecraft mass, require low power by removing the need for heating, and that can operate in vacuum or abrasive conditions. Typical gearboxes used in planetary robotics applications are steel that are heated to prevent the solidification of liquid lubricant. For example, the Mars rovers Perseverance and Curiosity both use wet-lubricated steel gearboxes in their drive motors, which requires a significant amount of heating to keep the lubricant at the correct operational temperature. Smaller gearboxes, like the one powering the Ingenuity helicopter, are typically heated using the motor but require daily recharging with solar power to operate. In future planetary missions, such as those to asteroids or icy moons, robotic systems will be mass and power constrained, which drives the need for non-steel actuators that can operate without lubricant. However, in these conventional gearboxes when the lubricant is removed, the gearbox completely fails after less than a few thousand output cycles at torques less than half of what the gearboxes are rated for in terrestrial lubricated conditions. Accordingly, this disclosure is motivated to remove this unwanted weight, systems complexity, and low cycle lifetime by finding gear materials that could provide precise motion in extreme conditions, such as under vacuum at cryogenic temperature, or without lubrication.

Figure 2A:
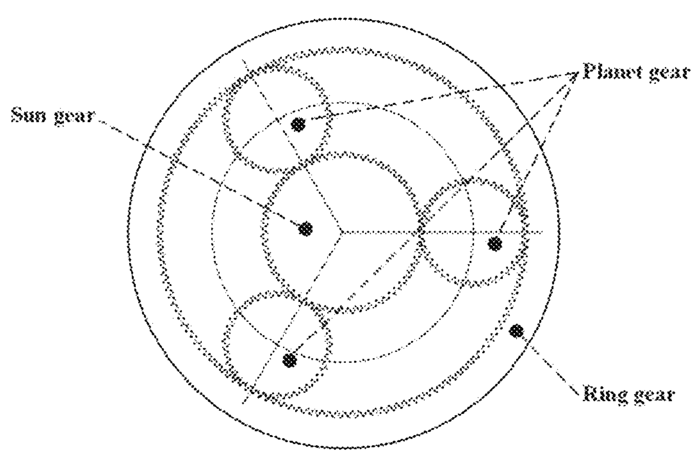
FIGS. 2*a* and 2*b* provide schematic diagrams of a planetary gearbox in accordance with the prior art.
Figure 2B:
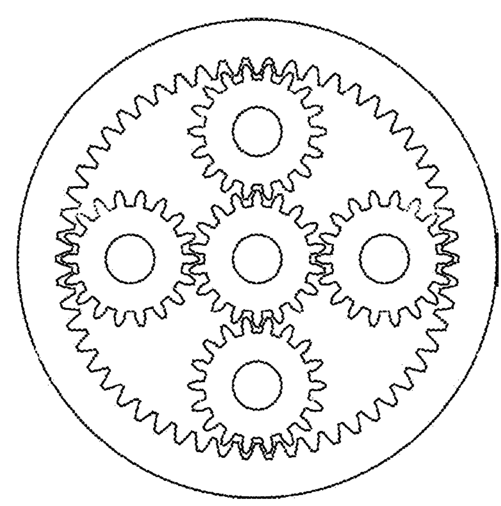

Embodiments according to the current disclosure are directed to hybrid gearboxes with improved wear characteristics. In various embodiments, such gearboxes are capable of operating in extreme conditions, e.g., in unlubricated and cold operations. Many embodiments are directed to planetary gearboxes, which include a central sun gear that spins around a central axis and interlocks with one or more planet gears that are disposed between the sun gear and a ring or outer gear. An exemplary planetary gearbox is shown in FIG. 1. Although two planet gears are shown in FIG. 1, it will be understood that any number of planet gears may be used in such gearboxes, such as, for example, three or four planet gears as shown in FIGS. 2*a* and 2*b*. Embodiments utilize combinations of materials to provide gearboxes with increased operational lifespans in extreme conditions, such as, for example, temperature, pressure, and unlubricated applications. Embodiments according to the disclosure consider optimum gear geometry, wear surface, wear mechanism, proper material selection for pins and bearings, and the center distances to mitigate thermal expansion mismatch. Embodiments of the current disclosure utilize a combination of materials with different hardness/modulus properties to dramatically increase the operational lifetime and conditions of the gearboxes, and specifically combinations of different steels, different BMGs, and combinations of steels and BMGs.

Figure 3:
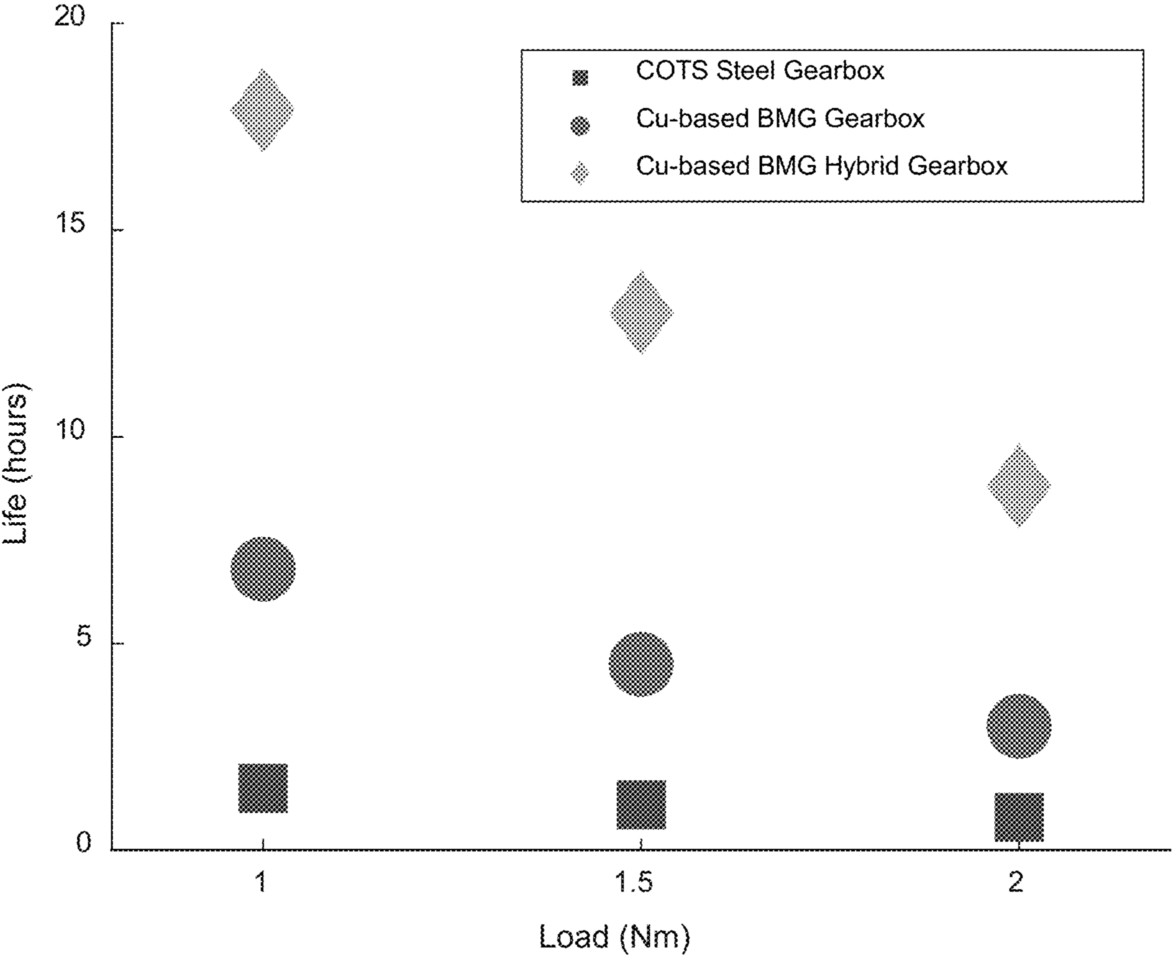
FIG. 3 provides data on the results of lifetime tests conducted on conventional steel gearboxes and gearboxes formed of BMG materials and hybrid steel/BMG materials in ambient temperatures in accordance with embodiments of the disclosure.

FIG. 3 provides data on unlubricated lifetime tests performed on conventional all steel gearboxes and gearboxes made in accordance with embodiments formed of BMG gears and hybrid gearboxes formed of a mixture of steels and BMGs. The planetary gearbox tests were conducted according to the procedure given in the exemplary embodiments at 25° C., 225 RPM, and loads of 1 Nm, 1.5 Nm, and 2 Nm. In such embodiments it will be understood that the sun gear experiences multiples of the number of wear interactions per revolution that any one of the planet gears does. More specifically, in the tests, conventional gearboxes formed of all steel interlocking gears were tested along with gearboxes according to embodiments formed of BMG gears (e.g., $Cu_{43}Zr_{43}Al_7Be_7$), and then hybrid gearboxes according to embodiments comprising both steel and BMG gear elements (e.g., Cu, Ni, Ti, Zr, etc. based BMGs).

Figure 4A:
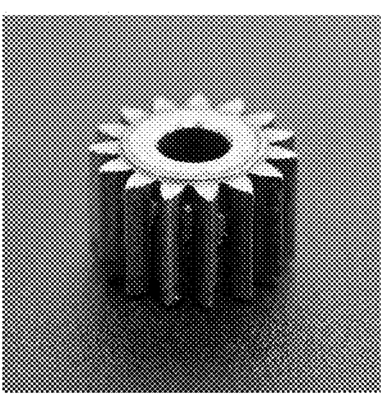
FIGS. 4*a* to 4*f* provide images of embodiments of sun and planet gears post testing in the experiments conducted to generate the data summarized in FIG. 3.
Figure 4B:
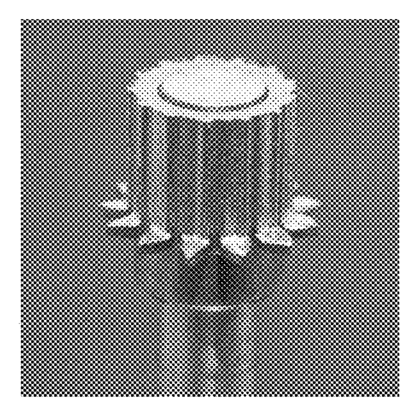
Figure 4C:
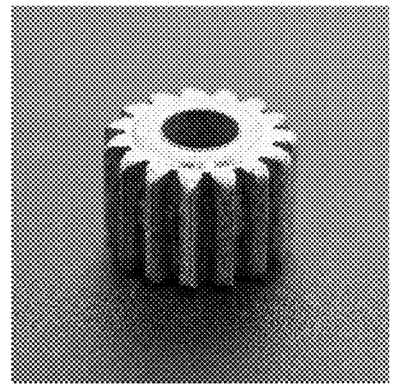
Figure 4D:
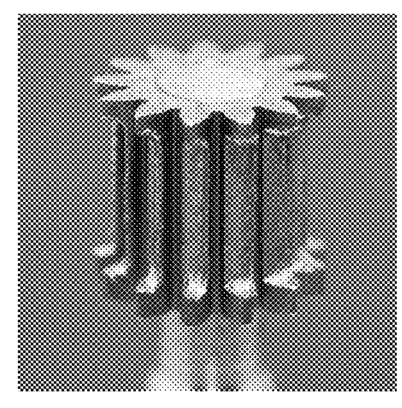
Figure 4E:
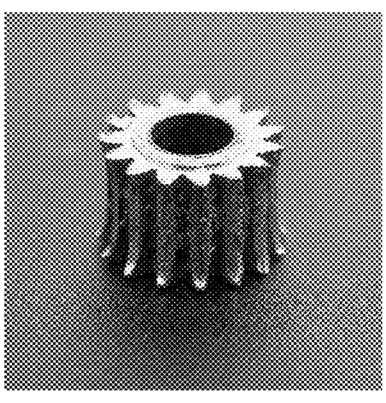
Figure 4F:
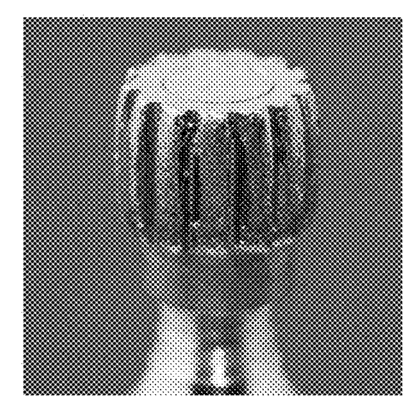

FIGS. 4*a*-4*f* show the state of the planet gear and sun gear from one embodiment of each tested gearbox configuration after the conclusion of the test. As shown in FIGS. 4*a* and 4*b*, post-test gear wear examination showed that conventional COTS gearboxes comprising steel planet gears and a steel sun gear led to the rapid and complete destruction of the sun gears resulting in the total failure of the gearbox at all torques. By contrast, as shown in FIGS. 4*c* and 4*d* the gearboxes containing all BMG planet and sun gears (e.g., Cu-based) according to embodiments resulted in a dramatic extension of the lifetime of the gearbox (e.g., 5X improvement) across all torques. While this improvement is significant over the running life of the unlubricated conventional steel gearbox, unprecedented improvement is shown by embodiments of the hybrid gearboxes (e.g., Cu-based BMG planet gears with a steel sun gear). In fact, as shown in the figures, hybrid gearboxes according to embodiments double the running life of the all BMG gearboxes (again across all torques) and results in gearboxes that are comparable to fully lubricated gearboxes placed under the extreme conditions experienced in space applications (e.g., cold temperature, vacuum, temperature swings, etc.). Specifically, space applications typically require 10,000 to 100,000 output revolutions. The results show that for conventional unlubricated steel gearboxes at 2 Nm (which is the continuous rated torque for the COTS steel gearbox when under normal terrestrial lubrication conditions) the lifetime is ~30 minutes which gives only 1,705 output revolutions, all BMG gearboxes according to embodiments results in 2.6 hours of lifetime, which gives 8,863 output revolutions, and the hybrid gearboxes result in a lifetime of 8.7 hours which gives 29,659 output revolutions. Moreover, the wear that is shown in FIGS. 4*e* and 4*f* is evenly distributed between the sun and planet gears, which is a very different overall wear pattern than is seen in the COTS steel of FIG. 4*a* and FIG. 4*b* or the BMG pair of FIG. 4*c* and FIG. 4*d* configurations.

These harsh unlubricated tests were chosen to probe the boundaries of what the bare and unlubricated materials were capable of, and to discover the failure modes. Even though these tests are purposefully unlubricated, they provide insight to the conditions that develop when state of the art cryogenic capable lubricants developed for space flight conditions break down. Common cryogenic capable lubricants are found in the form of dry-film solid lubricants (e.g., $MoS_2$, $WS_2$) and special chemical formulation oil lubricants (e.g., Perfluoropolyethers, multiply-alkylated cyclopentanes). Dry film solid lubricant has a limited lifetime as the coating is worn away by repeated cycling. In addition, the lifetime of dry film lubricant is also sensitive to the applied contact stress, as the higher contact stress removes more of the film and shortens the useful lifetime of the dry film lubricant. Specially formulated wet lubricants are also susceptible to breakdown through evaporation in vacuum at high contact stresses. Thus, performing tests at high contact stresses under unlubricated conditions gives insight to the conditions that are challenging for even specially lubricated systems operated at the harsh conditions of cryogenic temperatures and vacuum.

Figure 5:
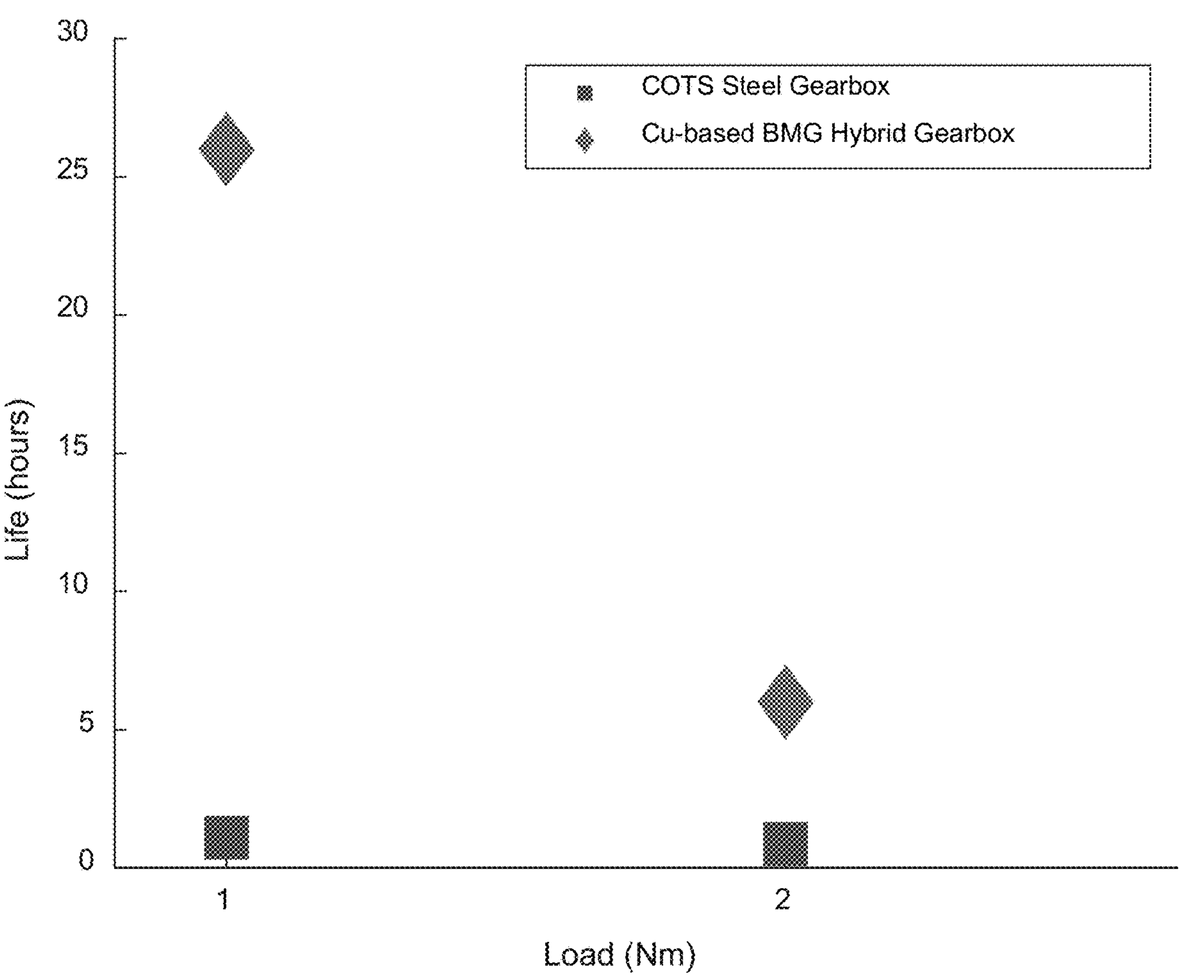
FIG. 5 provides data on the results of lifetime tests conducted on conventional steel gearboxes and gearboxes formed of BMG materials and hybrid steel/BMG materials in cryogenic temperatures in accordance with embodiments of the disclosure.
Figure 6A:
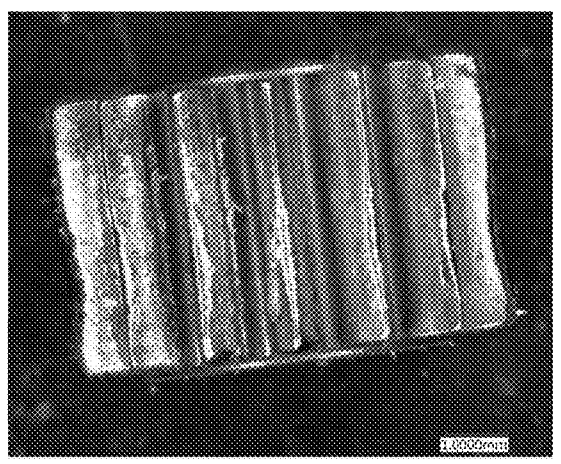
FIGS. 6*a* to 6*d* provide images of embodiments of sun and planet gears post testing in the experiments conducted to generate the data summarized in FIG. 5.
Figure 6B:
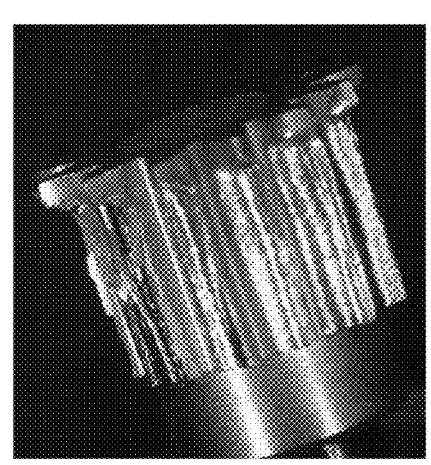
Figure 6C:
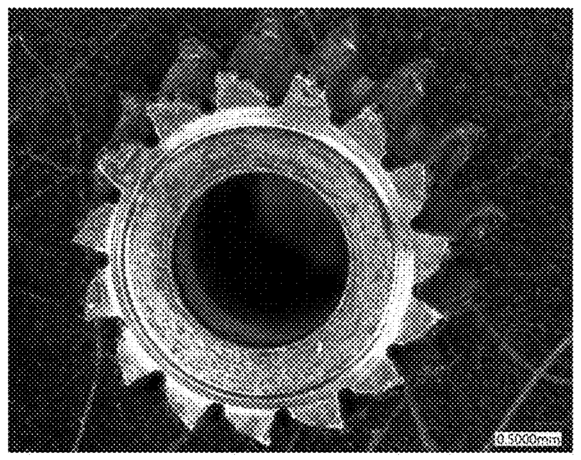
Figure 6D:
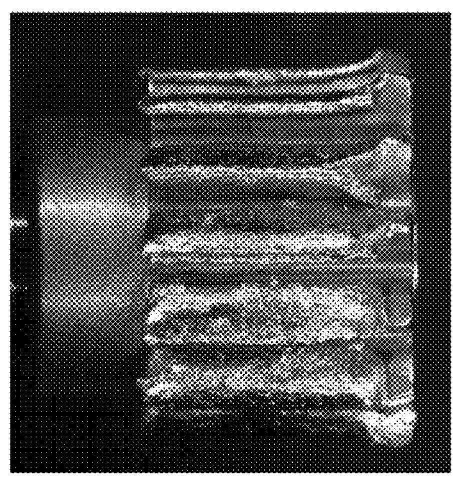

Further testing of planetary gearboxes was carried out according to the procedure given in the exemplary embodiments at −50° C. and 225 rpm input speed to compare the low temperature performance of the COTS steel gearbox and the Cu-based BMG hybrid gearbox. FIG. 5 shows the very short lifetimes of the COTS steel gearbox compared to the Cu-based BMG hybrid gearbox when operated at −50° C. FIGS. 6*a*-6*d* displays the post-test conditions of the sun and planet gears for the −50° C. testing. The same wear trend as seen in FIGS. 4*a*-4*f* repeats in FIGS. 6*a*-6*d* where the COTS steel gearbox sun suffers catastrophic failure, while the gradual and mutual wear of Cu-based BMG hybrid gearbox extends the operational lifetime of the gearbox. The unique combination of low stiffness, good hardness, and good wear resistance of this exemplary BMG material enabled this much slower wear interaction.

These results demonstrate that by varying the materials of the interlocking gears in accordance with embodiments, gearboxes can be formed capable of performing under extreme conditions (e.g., unlubricated) with improved lifetimes. More specifically, the tests described in the disclosure show that gearboxes fail as a result of wear conditions between the gears and that by managing the wear characteristics of the interlocking gears in the overall gearbox improvements to operational lifetime and use within extreme conditions can be improved. For example, the tests demonstrate that conventional all steel gearboxes fail primarily via jamming due to aggressive wear. In short, as soon as the steel of the interlocking gears begin to wear and creates chips of steel (images of typical wear for the steel gearboxes are provided in FIGS. 4*a* and 4*b*), this steel wear debris jams the gearbox and causes catastrophic failure. In the enclosed tight tolerance environment of a working gearbox the chips accumulate, and if they are not ground into powder quickly the teeth are jammed and the strength of the gear teeth are exceeded, resulting in full fracturing of the gear teeth. By contrast, the BMG gearboxes according to embodiments show improved lifetime at least in part because of the lack of this jamming phenomenon. The combination of the properties offered by BMGs (e.g. the low modulus, high strength, high wear resistance, low density, no strain hardening or ductile plasticity) allow the materials to wear (images of typical wear for the all BMG gearboxes are provided in FIGS. 4*c* and 4*d*) without generating debris that would jam the gearbox as seen with the steels, as such, though wear occurs the gearbox does not suffer premature catastrophic failure as a result of the wear.

Some of these observations can be explained by the contact stress of the gear interactions. For example, contact stress is lowest with embodiments that employ all BMG gears (due to the low modulus ~100 GPa), and the contact stress is the highest for the all steel configuration (due to the high modulus ~200 GPa). Accordingly, the higher contact stresses of the steel gears could be seen to generate the most catastrophic failures. However, embodiments of gearboxes cannot be optimized by merely referencing contact stress. For example, the contact stress with interlocking BMG on steel gears in accordance with hybrid gearboxes falls between all steel and BMG only gearboxes, but as previously discussed hybrid gearboxes show the lowest wear rate. In addition, the wear shown in the gears in the hybrid gearboxes (e.g., symmetric rounding of both planetary and sun gears) unlike the asymmetric wear shown in conventional steel gearboxes (images of typical wear for the hybrid gearboxes are provided in FIGS. 4*e* and 4*f*). (A comparison of the wear pattern of the planet gears from all three gearbox types is provided in FIG. 4.) Although in this embodiment symmetric wear is shown to significantly increase lifetime, it will be understood that embodiments may still contemplate rotational systems with asymmetric wear as long as the rotational pairs cause the lowest amount of mutual damage.

Gearboxes according to embodiments use materials for interlocking gears such that the contract stress on the interlocking gears is maintained below those experienced by steel gearboxes, and the modulus between the sun and planet gears are balanced to provide an overall gear wear pattern that is approximately symmetric. As previously discussed, because the central or sun gear engages multiple planet gears its wear drives the wear within the gearbox, thus reducing the wear on the central or sun gear according to embodiments helps improve the operational lifetime of the overall gearbox. In many embodiments, the planet gears are formed of materials with lower modulus and thus lower contact stress to minimize damaging the sun gear per interaction, however, the specific level of hardness and modulus will depend on the properties of the sun gear. In most BMGs toughness drops with increasing hardness, but harder steels could then be used potentially increasing the overall operational life of the gearbox. In short, gearboxes according to embodiments are configured by balancing the wear that each of the gear elements imposes on its mating gear element. Accordingly, in many embodiments, the combination of materials are selected such that the material forming the center or sun gear has a higher hardness/modulus than the materials of the surrounding planet gears. In various embodiments of hybrid gearboxes, a sun gear formed of either a steel material or a BMG material having a higher hardness/modulus is paired with one or more planet gears, and the planet gears are formed by BMG materials having low modulus and high hardness. In various embodiments steel sun gears are combined with Cu-based BMG planet gears.

Although specific combinations of gear materials for use in BMG and hybrid gearboxes according to embodiments are discussed above, it will be understood that many different combinations of materials may be used in accordance with such embodiments. In accordance with many embodiments material combinations are selected by determining the wear rate for a given material combination at a given contact stress pair and selecting those material combinations that have contact stresses below the contact stress of a conventional steel gearbox pair, and that have wear rates between the various interlocking gears as previously discussed that are approximately symmetric under proposed operating conditions or where mating pairs of rotational elements cause the lowest mutual damage. Exemplary BMGs may include compositions based on Cu, Ni, Fe, Ti and Zr. Selection of specific alloys will depend on the application proposed. With respect to the selection of specific alloys for specific applications, one skilled in the art will be able to determine such selections based on available alloy data. For example, ZrCuNiBe alloy (Vitreloy 1b) has exceptional glass-forming-ability (GFA) and can be cast over 20 cm thick into fully glass parts. TiZrCuBe alloy is known for its low density comparable with crystalline beta-titanium alloys. CuZrAlBe is a well-known copper-based BMG that is more brittle than other BMGs but has been shown to have excellent wear resistance in gear-on-gear testing. $Cu_{43}Zr_{43}Al_7Be_7$ may be used in many terrestrial applications as the replacement of the Zr with Cu is shown to yield a superior wear result in air. In contrast, when wear tests are done in vacuum, Cu rich alloys have wear results that improve marginally while Zr rich alloys have wear results that improve dramatically.

Although the above discussion has focused on the compositions used to form the bodies of the gears, many embodiments may also include surface treatments or coatings to improve the longevity of the gear elements. In conventional gearboxes lubrication is used to prevent wear, if there are still problems with lubrication shot peening or hard coatings may be used to delay the initiation of wear as long as possible. Typically, such coatings or treatments are not used in unlubricated settings because the coatings are so thin and the damage so great that they are worn away almost immediately. However, the use of BMGs in gearboxes according to embodiments opens up other possibilities. Despite the monolithic nature of BMGs, the wear performance changes by orders of magnitude in different alloy systems due to chemistry effects. A significant discovery that copper zirconium-based (Cu-based) BMGs have dramatically improved wear behavior, has indicated that the formation of ceramic oxide layers control the behavior. The formation of different thicknesses of zirconia on the Cu-based amorphous metal, has resulted in tribological improvements of more than an order of magnitude compared to conventional gear steels. Accordingly, many embodiments incorporate hard layers (e.g., oxides and ceramic surfaces) on the gear elements of the gearboxes. In various embodiments, the coatings may be formed by placing the BMG gears in a furnace (around the glass transition temperature (Tg) of the BMG) to grow a thin oxide film. Any suitable coating chemistry may be used (e.g., Cu and Zr oxide systems). The oxides may be formed on any of the gear elements, including, for example, oxidizing BMG planet gears and disposing them with steel sun gears, or oxidizing a BMG sun gear and disposing it with unoxidized BMG planet gears.

Figure 7A:
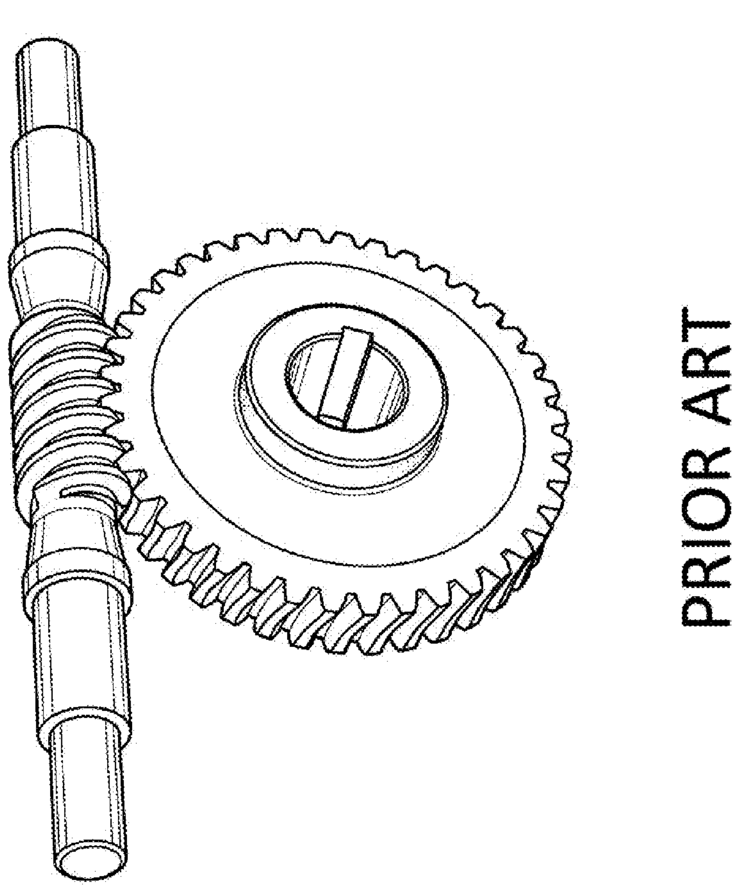
Figure 7B:
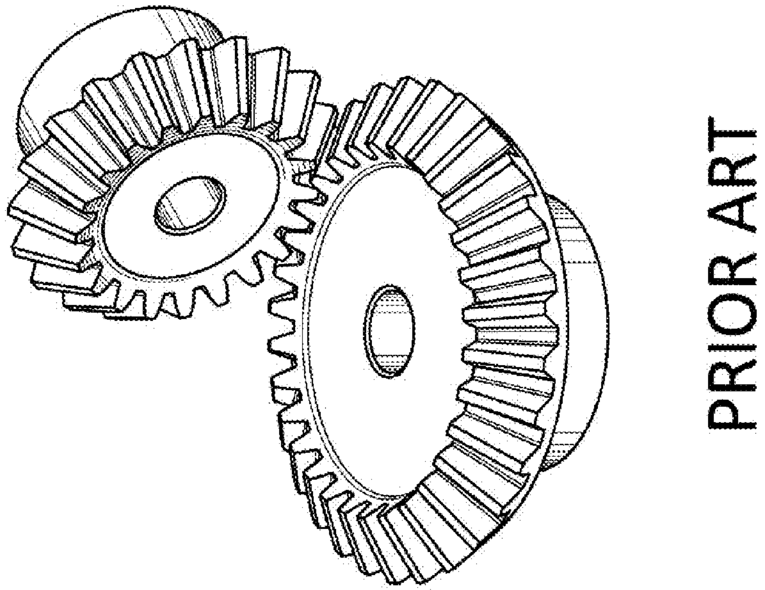
Figure 7C:
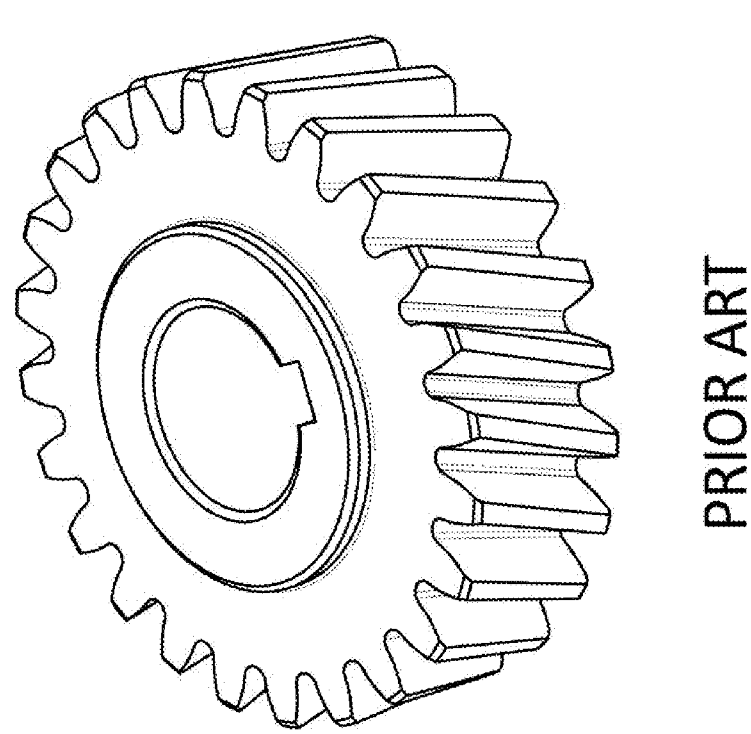
Figure 7D:
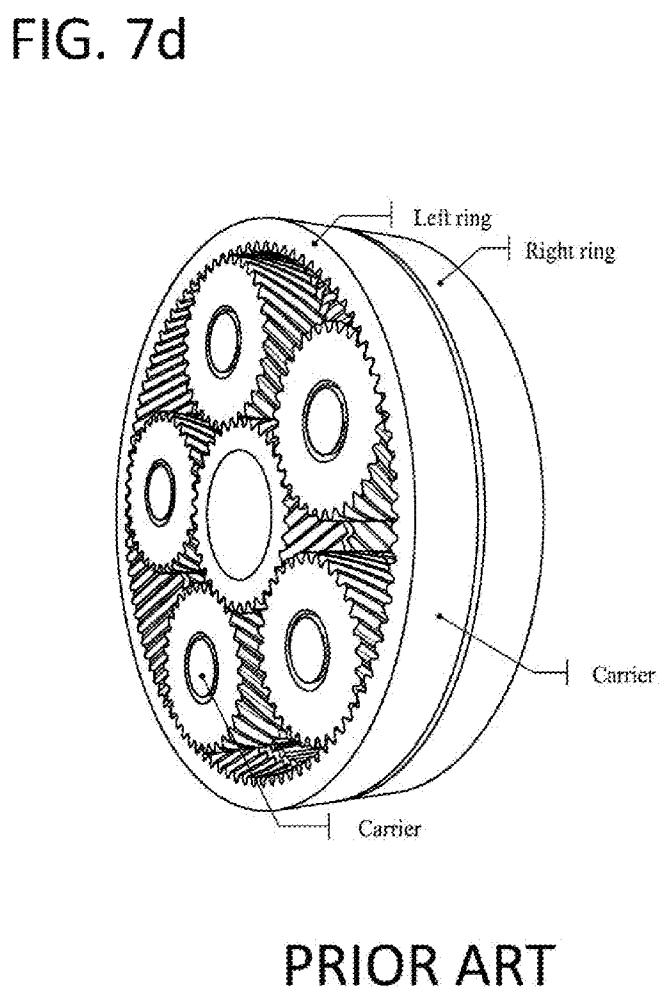

Although the above discussion has focused on gearboxes containing planetary gears, it will be understood that this is merely a singular use case of embodiments of the disclosure. Any rotational gear system comprising at least two rotational elements that experience different cycle rates may incorporate the hybrid material components described above. Examples of other gear systems for which the higher hardness/modulus materials described above would be used on the high cycle rotational elements and lower hardness/modulus materials described above would be used on the low cycle elements include, but are not limited to: worm gear systems (FIG. 7A), bevel gear systems (FIG. 7B), and helical gear systems (FIG. 7C). In some embodiments the helical gear systems may, according to embodiments, be arranged in planetary gearbox arrangements as described above (FIG. 7*d*), but regardless of the arrangements of the specific gear components embodiments of such rotational systems where at least a pair of gears rotate together and transfer motion therebetween, and wherein the elements of the gear pair cycle at different rates, may incorporate the hybrid material components as outlined herein thereby improving overall gear system lifetime. In particular, any of these rotational systems in which the use of a lubricant is undesirable or impossible may increase lifetime in the absence of such lubrication or under extreme conditions using the systems and methods described by the embodiments.

The above sections have described rotational systems that incorporate gears, however hybrid material methods and systems as described above may also be comprised within other types of rotational systems in which at least two rotational elements engage to transfer motion therebetween and wherein at least one of the rotational elements cycles at a higher rate. One exemplary system is the traction drive.

Traction drives are a type of mechanical power transmission system used to transfer motion and power between two rotating shafts. They are commonly found in various applications, from vehicles to industrial machinery. The main principle behind traction drives is the utilization of friction between contacting surfaces to transmit torque. Instead of relying on gears or belts, traction drives rely on the grip and friction between the contacting surfaces to transmit power.

Figure 8:
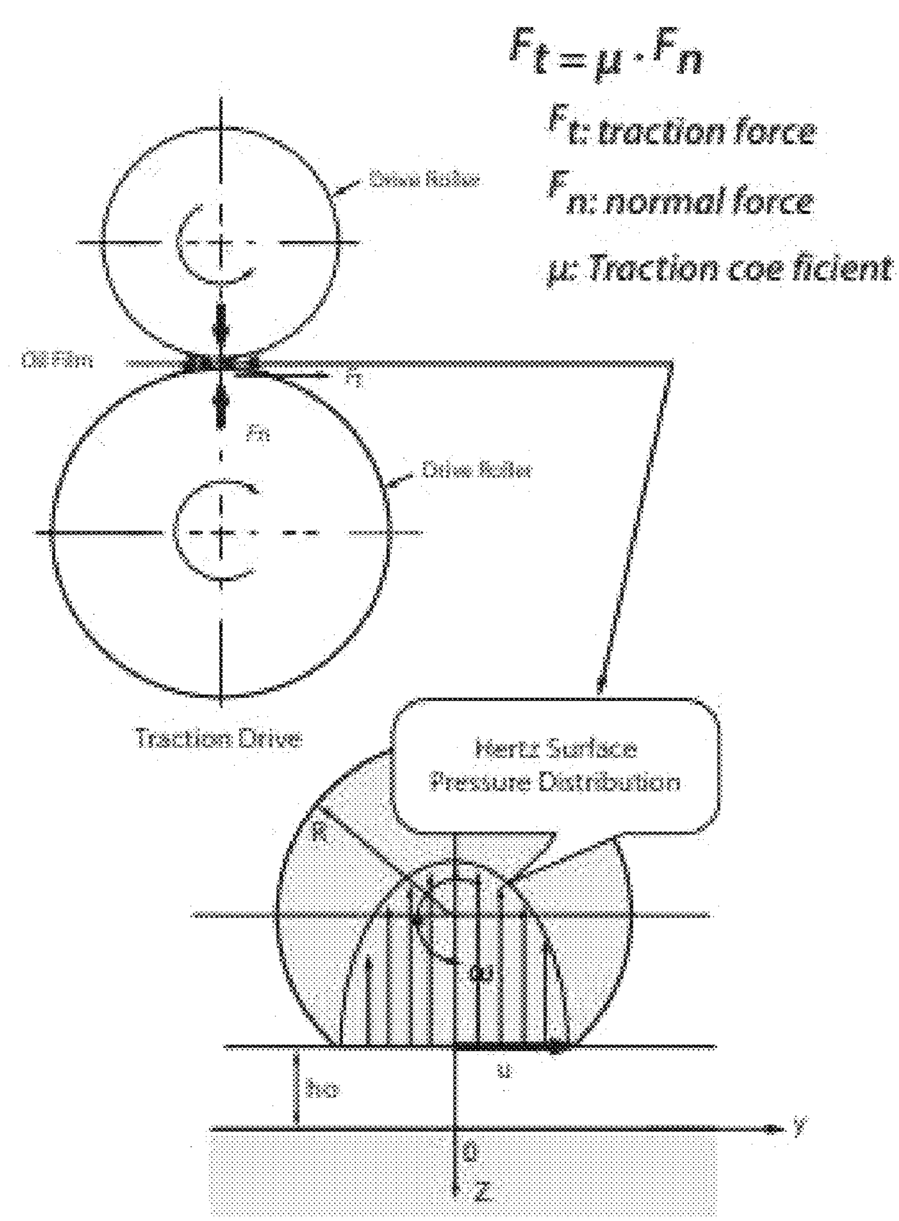
FIG. 8 provides a schematic diagram of a stylized traction drive in accordance with the prior art.

As shown in FIG. 8, traction drives typically consist of two components: a driving wheel and a driven wheel. These wheels are in contact with each other, and torque is transferred through the friction between their surfaces. The driving wheel's rotation creates a force between the surfaces, causing the driven wheel to rotate. The amount of torque transferred depends on the coefficient of friction between the surfaces, the normal force pressing them together, and other factors. Conventional traction drive technology uses traction fluids to transmit torque while also preventing aggressive wear. The traction coefficient determines the traction force and hence the torque that can be transmitted for a given normal force. The traction fluid is subjected to high pressures to increase its viscosity in order to more effectively transmit forces by friction. Those traction fluids have a traction coefficient of about 0.1, hence, enabling to transmit about 10% of the normal force applied.

Traction drives can have many advantages. They can be highly efficient due to the direct transfer of torque without the need for intermediate components like gears, reducing energy losses. Traction drives can offer smoother torque transfer compared to traditional gear systems, reducing vibrations and noise. Traction drives can be more compact and lightweight compared to some traditional mechanical transmission systems. The absence of gears or belts means there are fewer components that can wear out and require maintenance. However, there are also challenges in using them. They have limited torque capacity and might not be suitable for applications requiring extremely high torque transmission. The use of traction fluids with a traction coefficient of 0.1 limits the force transmission efficiency, e.g., only 10% of the normal force can typically be transmitted. In some cases, there can be slippage between the contacting surfaces, which can lead to a loss of efficiency or inaccuracies in speed control. The contacting surfaces can experience wear over time due to friction, which might require periodic maintenance. And in particular, the high cycle components.

Figure 9:
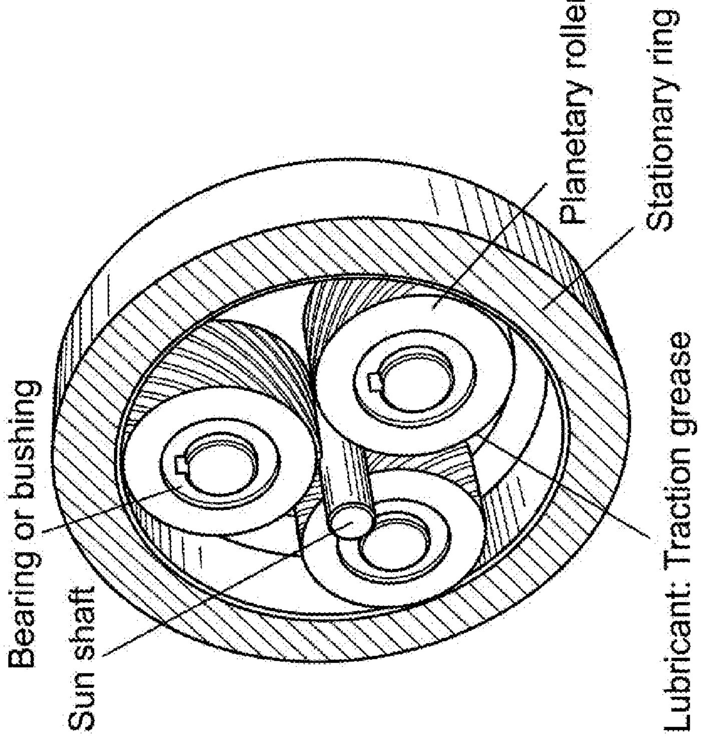
FIG. 9 provides a schematic diagram of a planetary traction drive in accordance with the prior art.

Although it will be understood that hybrid embodiments contemplate any traction drive in which two rotational rollers engage with each other and have different cycle rates, as shown in FIG. 9, traction drives can take the form of a planetary traction system, similar in operation to the planetary gearboxes previously discussed. In the example, the drive system has a sun roller, planet roller (in the exemplary system shown in the figure four of these positioned around the sun) and the annulus (which is fixed). The parts are preloaded by interference fit, i.e. the annulus is slightly too small and so when the planets and sun are squeezed into place such that they flex and create a compressive load at the contact surfaces. This load is what allows the system to transmit torque without slipping. As in planetary gearboxes the planet and sun rollers suffer two main failure modes: rolling contact fatigue and rolling bending fatigue.

In short, conventional traction drives, like the other rotational systems discussed herein suffer from wear and require proper material selection and control of the normal force to ensure efficient operation and to maximize the lifetimes of the components. Moreover, like many of the gear systems and particularly the planetary gearboxes, lubrication is required for the operation of conventional traction drives. However, the traction fluids reduce force transmission, and the systems suffer from wear which limits the lifetime of the drive components.

Embodiments form traction drives with higher lifetime and greater ability to operate under extreme conditions and without traction fluids by using hybrid materials on the roller components. As previously discussed with respect to planetary gearboxes, because the central or sun roller engages multiple planet roller its wear drives the wear within the traction drive, thus reducing the wear on the central or sun gear according to embodiments helps improve the operational lifetime of the overall drive system. In many embodiments, the planet rollers are formed of materials with lower modulus and thus lower contact stress to minimize damaging the sun roller per interaction, however, the specific level of hardness and modulus will depend on the properties of the sun roller. In most BMGs toughness drops with increasing hardness, but harder steels could then be used potentially increasing the overall operational life of the drive. In short, traction drives (like planetary gearboxes) according to embodiments are configured by balancing and/or reducing the wear that each of the roller elements imposes on its mating roller element. Accordingly, in many embodiments the combination of materials are selected such that the material forming the center or sun roller has a higher hardness/modulus than the materials of the surrounding planet rollers. In various embodiments of hybrid traction drives a sun roller formed of either a steel material or a BMG material having a higher hardness/modulus is paired with one or more planet rollers, and the planet rollers are formed by BMG materials having low modulus and high hardness. In various embodiments steel sun rollers are combined with Cu-based BMG planet rollers.

Although the implementation of hybrid traction drive systems is similar to that described with respect to planetary gear boxes, there are added advantages not applicable to gearboxes. First, the ability to run without lubrication is significant as the use of the lubrication reduces the ability of the system to transfer torque between the elements (as described above). What is more, traction rollers are designed to flex when placed under strain within the traction drive system, the low modulus of the BMG materials within embodiments of the hybrid system leads to not only lower contact stresses, but also greater flexing of the rollers at the contact patch area. This greater flexing means the contact patch area is greater thus actually increasing the traction force experienced by the drive over the harder less malleable materials used in conventional traction drive systems.

EXEMPLARY EMBODIMENTS

To test the wear and lifetime characteristics of gearboxes in accordance with embodiments the following procedures were used.

Disassemble and clean commercial off the shelf gearboxes to remove any lubricant.

Replace the standard lubricated bearings with bearings suited for unlubricated use.

Assemble the gearbox (for these tests one stage gearboxes having 4 planet gears driven by 1 sun gear were used).

The gearboxes were assembled with either conventional steel gears, BMG gears (e.g., Cu-based alloys), or a combination of steel and BMG gears (in all cases the external ring gear housing remains the same).

Install the gearbox in the test rig and equilibrate the gearbox and test rig to the desired test temperature.

Complete a 7000 input cycle no torque run-in and bring the gearbox to a stop.

Apply the output load to the gearbox by means of a brake and then run the input motor at a constant direction, constant input motor speed, and maintain constant output load until failure.

The failure condition was met when one of the following occurred:

- The motor could not provide the torque necessary to rotate the gearbox, evident by an alarm in the motor control program, as well as complete stoppage of both the input and the output.
- The gearbox could no longer transfer torque to the output. This was characterized by the input spinning freely, but the output torque dropping to zero, and the output shaft rotation stopping entirely.

To form BMG gears, although net-shaped injection-molding may be used for high volume production, cylindrical, bevel, or worm gears can be rapidly generated from high-quality BMG feedstock through subtractive methods. In such embodiments a tilt-casting arc melter is used to alloy, melt and pour up to 300 grams of titanium, zirconium or copper-based BMGs into precision-machined molds to form feedstock. The feedstock is ultra-high purity BMG feedstock material (typically less than 200 ppm oxygen and 100 ppm carbon), to guarantee highest material performance and thus the best performance of BMG gears manufactured). The gear elements are formed from cylindrical preforms that are used to manufacture both large planet gears and gearboxes housings for small planetary gearboxes. In an example, the cylindrical feedstock may be over 1.5 inches in diameter and is made from a Cu-based BMG optimized for low-wear gears. The cylinders are then sectioned to length and are then precision machined into gears or wire-EDMed into a housing with internal gears. Although Cu-based BMG feedstock is described above it will be understood that many different alloys could be formed with exceptional glass forming ability (GFA) based in zirconium, with density comparable to beta-titanium alloys using alloys based in titanium, and in alloys shown to be good for wear resistance based in copper-zirconium. Although not discussed, BMG composites may also be used, which dramatically expands their BMG palette for a variety of applications.

To assure that BMG gear components meet the required tolerances, CMM inspection equipment may be used, including a Liebherr WGT 280 and a Zeiss O-Inspect, capable of measuring gear accuracy to 1 micron on gears as small as 2 mm and as large as 10 cm. The inspection equipment ensures that the BMG gears are machined to the correct tolerances so that the assembled planetary gearbox runs with high efficiency when assembled. For the testing presented here, the gears met the tolerance specifications for ISO 1328-1:2013 quality level Q3 to Q5. Achieving high quality levels reduces stress-concentrators and helps prevent premature failure of the BMG material and can substantially extend the life. BMG gears can thus be implemented under optimum operating conditions, and life as a function of pitch line velocity, contact stress, and temperature, for the gearboxes can be properly identified, and the improvement the BMG gears provide compared to the state of the art in unlubricated and cold operations can be measured.

Figure 10:
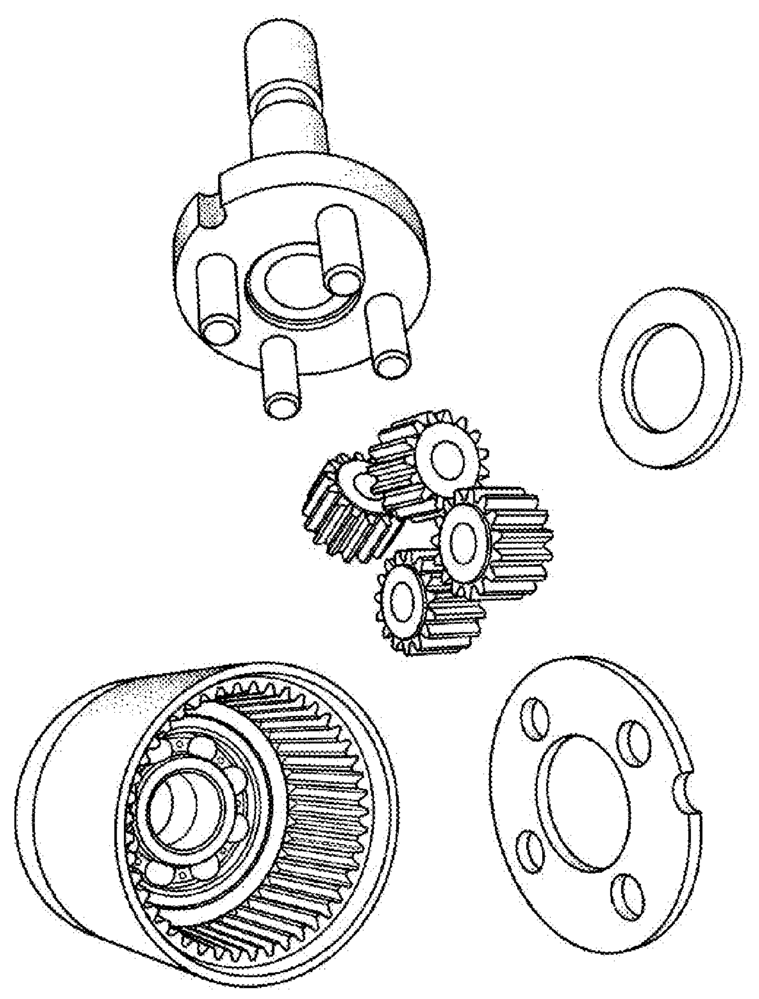
FIG. 10 depicts a disassembled gearbox in accordance with some embodiments of the disclosure.

Gearbox life testing was performed by the above testing procedure using 22 mm single stage gearboxes with a reduction ratio of 4.4, a module of 0.4, that contained four planets that were captured on the output carrier, and each planet rode on a zirconia pin plain bearing. The output carrier had output bearings that were press fit into the ring gear housing. The output carrier was restrained axially to the ring gear by an exterior press fit ring. A disassembled gearbox is shown in FIG. 10.

Six different gear pairs were tested in order to study their wear, lifetime, and failure modes. These tests were conducted to develop a gearbox that can provide improved performance and lifetimes at contact stresses where traditional lubrication schemes breakdown in a cold vacuum environment. The configurations of the gearboxes that were tested included:

- Steel ring gear, steel sun gear, steel planet gears (COTS Steel Gearbox)
- Steel ring gear, steel sun gear, Cu-based BMG planet gears (Cu-based BMG Hybrid Gearbox)
- Steel ring gear, steel sun gear, Zr-based BMG planet gears (Zr-based BMG Hybrid Gearbox)
- Steel ring gear, steel sun gear, Ti-based BMG planet gears (Ti-based BMG Hybrid Gearbox)
- Steel ring gear, steel sun gear, Zr-based Be-free BMG planet gears (Zr-based Be-free BMG Hybrid Gearbox)
- Steel ring gear, Cu-based BMG sun gear, Cu-based BMG planet gears (Cu-based BMG Gearbox)

The configurations of COTS steel gearbox, Cu-based BMG hybrid gearbox, and Cu-based BMG gearbox were tested at 25° C. at a constant direction, constant input speed of 225 rpm and torques of 1 Nm, 1.5N, and 2 Nm according to the exemplary procedure above. A plot of the results is shown in FIG. 3, and the post-test wear is displayed in FIG. 4. The longest life is seen by the Cu-based BMG Hybrid gearbox, followed by the Cu-based BMG gearbox, and the worst performance is seen by the COTS steel gearbox. The accumulation of severe damage on the sun gear results in the lower lifetimes of the COTS steel gearbox and the Cu-based BMG gearbox.

Further testing was done at −50° C. in a liquid nitrogen cooled thermal chamber. The gearbox configurations that were tested are the COTS steel gearbox and the Cu-based BMG hybrid gearbox. The tests were performed at a constant direction, a constant speed of 225 rpm at torques of 1 Nm and 2 Nm according to the exemplary procedure above. The lifetime results are shown in FIG. 5 and the post-test wear is displayed in FIG. 6.

The failure mechanism for all the COTS steel gearbox tests was characterized as aggressive flank wear damage accumulating on the sun gear, eventually generating large enough wear debris to cause catastrophic failure of the sun gear teeth. For all tests, the planet gears accumulated some flank damage but still spun freely about their carrier pin. If the steel wear debris generated was small enough to not jam the gearbox, the test could continue, but if any large pieces were generated, they would enter the gear mesh and cause outsized damage, leading to overload stress on the steel sun teeth. The plasticity and work hardenability of the steel wear debris increased the damage potential of any wear debris generated. The Cu-based BMG hybrid gearbox again showed the distributed mutual wear seen in the 25° C. testing that led to much increased life over the COTS steel gearbox.

Figure 11:
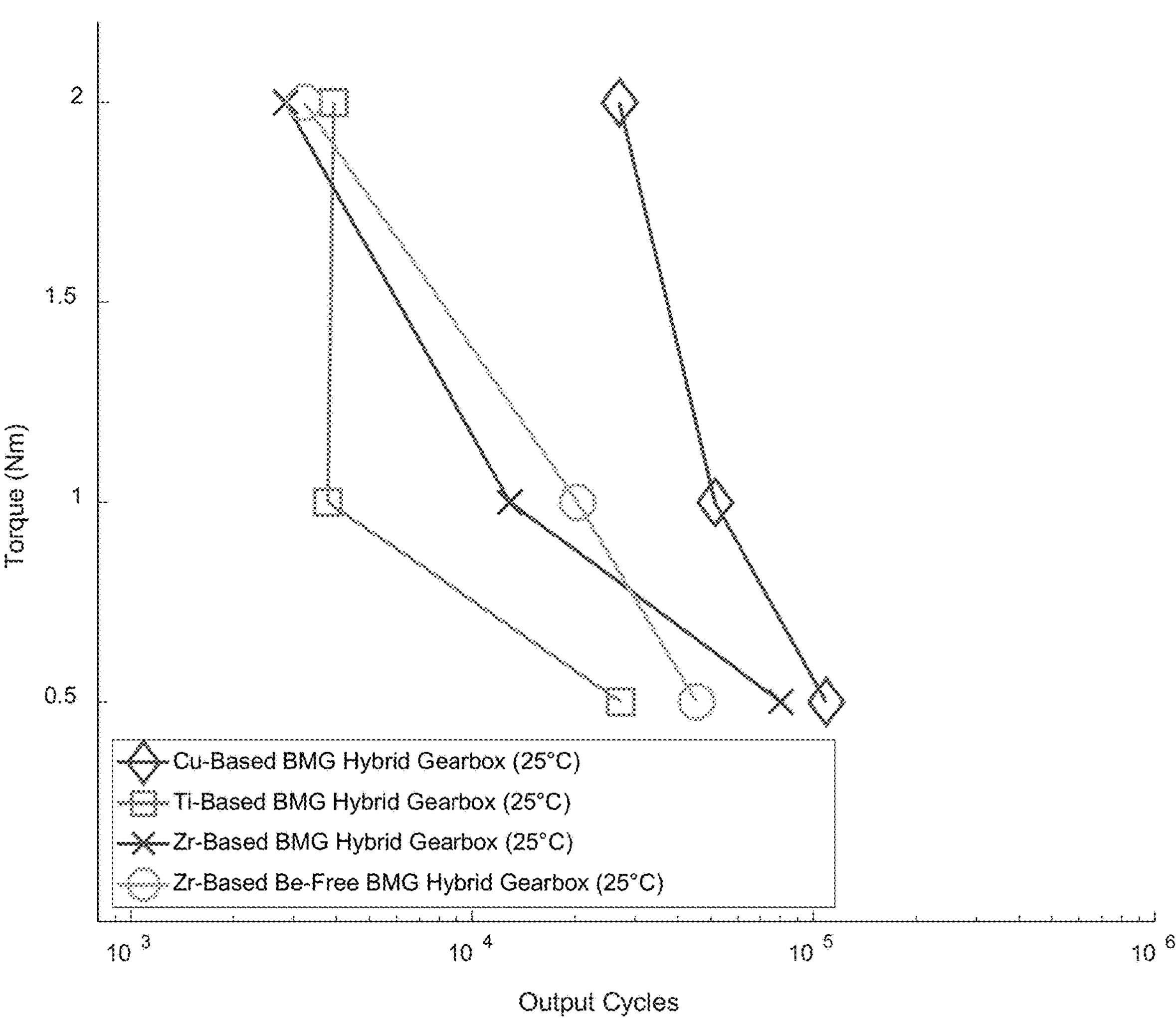
FIG. 11 depicts the performance of BMG alloy planet gears at ambient temperatures, in accordance with some embodiments of the disclosure.
Figure 12:
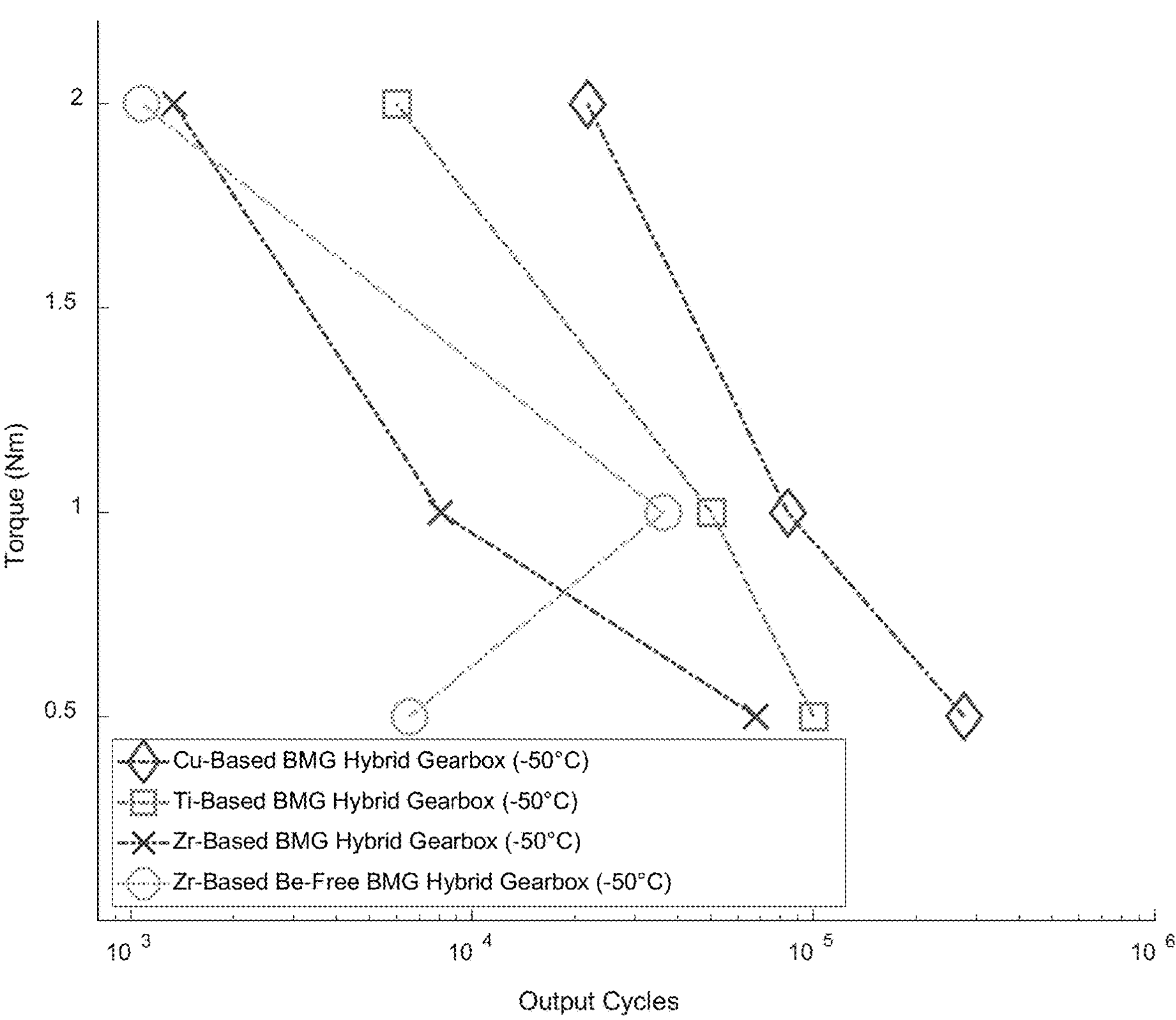
FIG. 12 depicts the performance of BMG alloy planet gears at cryogenic temperatures, in accordance with some embodiments of the disclosure.

Further testing of hybrid BMG planet gear configurations was performed according to the exemplary procedure detailed above. The four gearbox configurations tested were Cu-based BMG hybrid, Zr-based BMG hybrid, Ti-based BMG hybrid, and Zr-based Be-free hybrid. These four configurations were tested at a temperature of both 25° C. and −50° C. with constant output loads of 0.5 Nm, 1 Nm, and 2 Nm. The tests with a load of 1 Nm and 2 Nm were run at a constant speed of 225 RPM and the 0.5 Nm tests were run at a constant speed of 1000 RPM. The lifetime results of the four hybrid BMG planet gear gearbox configurations at 25° C. are depicted in FIG. 11. The lifetime results of the four hybrid BMG planet gear gearbox configurations at −50° C. are depicted in FIG. 12. In both ambient and cryogenic temperatures, the Cu-based BMG hybrid planet gear gearbox configuration performed at the test criteria for the longest amount of time. In both ambient and cryogenic temperatures, all BMG planet gear gearbox configurations performed at the test criteria for longer than the equivalent COTS steel gearbox configuration.

The Cu-based BMG planets outperformed all other tested BMG planets at the tested conditions of 25° C. and −50° C. for torques of 0.5 Nm, 1 Nm, and 2 Nm. The largest differential is seen at the highest torque of 2 Nm.

To demonstrate how lower stiffness materials reduce the contact stress in an exemplary embodiment of a gearbox, the gear calculation software (KISSsoft), was used to calculate the contact stresses of the sun-planet meshing interaction and the planet-ring meshing interaction for various implementations of planet gear materials. The stresses were calculated using a steel sun gear and steel ring gear, using detailed gear dimensions, tolerancing data, designated steel material properties, and bulk metallic glass material properties.

Figure 13:
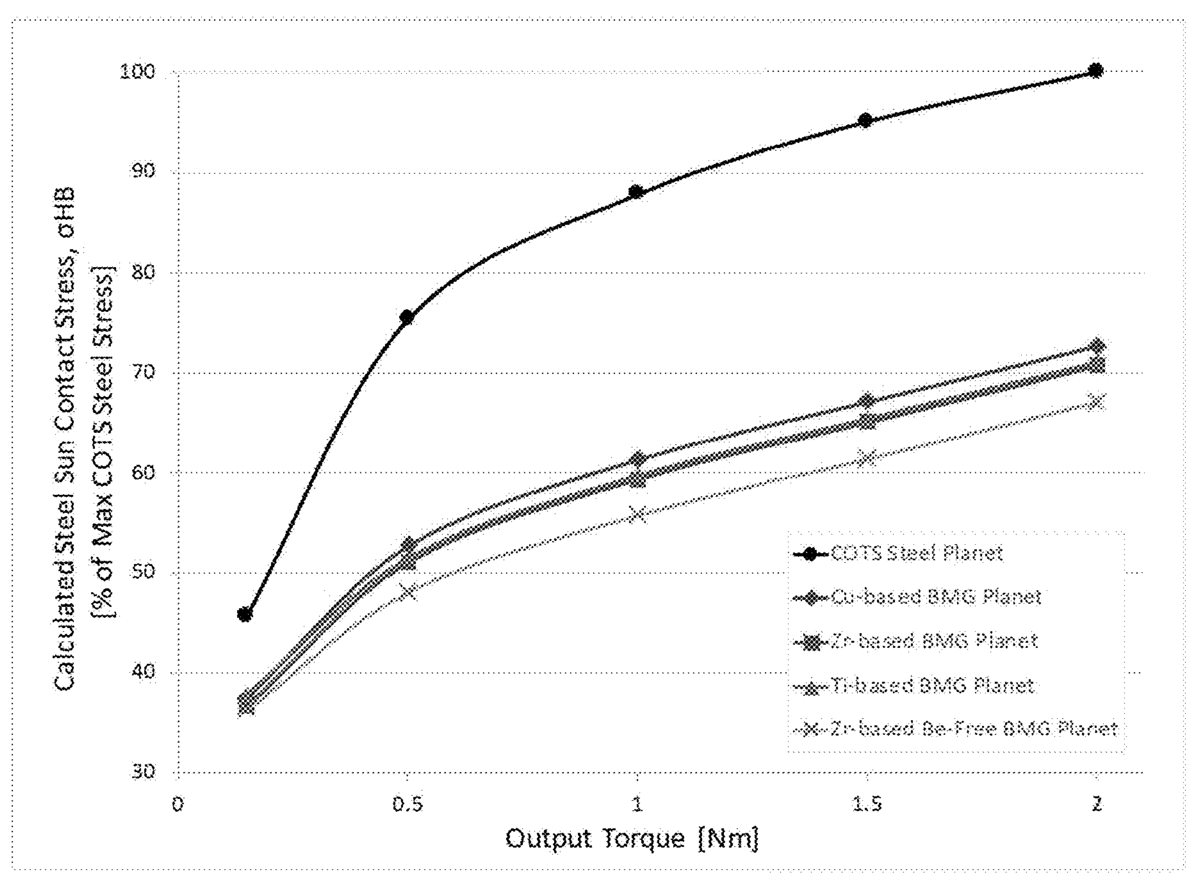
FIG. 13 depicts the contact stress experienced by the COTS steel sun and different planet gear materials, in accordance with some embodiments of the disclosure.

The contact stresses were calculated from an input torque, where the input torque was calculated from the output torque, assuming an 84% efficiency for the gearbox. FIG. 13 displays the contact stress of the sun-planet mesh for a steel planet gear, Cu-based BMG planet gear, Zr-based BMG planet gear, Ti-based BMG planet gear, and Zr-based Be-free planet gear scaled to the maximum stress seen on the steel planet gear at 2 Nm. The impact of the lower Young's modulus and higher Poisson ratio of these exemplary BMG materials is clearly seen to reduce the contact stress of the sun-planet interaction. The Young's modulus of steel is ~200 GPA with a Poisson ratio of 0.3, while the Young's modulus of the exemplary BMG materials is ~90-100 GPA with a Poisson ratio of 0.35 to 0.37. By replacing the steel planet with an exemplary bulk metallic glass planet of lower stiffness and higher Poisson ratio, the contact stress of the steel sun to BMG planet was reduced by approximately 20% for the 0.15 Nm load case and by approximately 30-35% for the loads greater than 0.5 Nm when compared to the steel sun to steel planet gear contact stress.

The stresses in the planet-ring mesh were about 30% lower than those in the sun-planet mesh, and the teeth of the ring gear saw the lowest overall number of mesh interactions. The flanks of the ring gear showed almost no damage after any of the tested conditions. Because of this, we focus on the higher stresses and damage seen in the sun-planet interaction. The gearbox performance was not determined solely by contact stress. Resistance to sliding wear, the strength of the alloy, toughness, and hardness of the alloy contributed to the overall performance and the data suggested that a BMG material with low stiffness, high Poisson ratio, good toughness, and good sliding wear resistance would operate favorably in an unlubricated planetary gearbox system, as well as a lubricated planetary gearbox system that has suffered lubrication breakdown.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

What is claimed is:

1. A device comprising, a sun element comprised of a first material with a first modulus;

a plurality of planet elements comprised of a second material with a second modulus; and a ring element;

wherein the sun element and the ring element are coaxial with an axis, and each of the plurality of planet elements are disposed between the sun element and the ring element;

wherein the sun element and each of the plurality of planet elements engage and transfer motion therebetween at a first interface and each of the plurality of planet elements and the ring element engage at a second interface, wherein the sun element wears at a rate proportional to the number of planet elements; and wherein at least one of the first material and the second material is a bulk metallic glass and the first modulus and the second modulus are unequal;

wherein the first material and the second material are selected so that the first modulus and the second modulus are proportional to the rate such that the sun element and each of the planet elements wear an approximately symmetric amount.

2. The device of claim 1, wherein the second material has a lower modulus than the first material, and the device is further configured to minimize contact stress at the first interface.

3. The device of claim 1, wherein the sun element and the plurality of planet elements are configured as gears with a plurality of gear teeth, and the device is further configured to balance wear on the plurality of gear teeth.

4. The device of claim 1, wherein the sun element has a higher hardness and modulus than each of the plurality of planet elements.

5. The device of claim 4, further comprising a second ring element and wherein the first rotational element, is configured to rotate about an axis, and the second ring element is disposed coaxially with the first rotational element and the second rotational element is disposed between the first rotational element and the second ring element.

6. The device of claim 1, wherein at least one of the first material or the second material is a steel alloy.

7. The device of claim 1, wherein the device is configured for operation above a set temperature.

8. The device of claim 1, wherein at least one of the plurality of planet elements and the sun element is further comprised of a third material at a contact surface.

9. The device of claim 8, wherein the third material is an oxide or a ceramic.

10. A device comprising, a first rotational element comprised of a first material with a first surface that rotates at a first speed; and a second rotational element comprised of a second material with a second surface that rotates at a second speed;

wherein the first surface and the second surface are comprised of different materials and engage at a hybrid material interface to transfer motion;

wherein the first rotational element rotates at a first cycle period, the second rotational element rotates at a second cycle period, and the first cycle period is different from the second cycle period; and wherein at least one of the first material and the second material is a bulk metallic glass;

wherein the first material and the second material are selected for a desired property selected from the group consisting of: operational lifetime, operational environment, hardness, or modulus;

wherein the first rotational element wears at a first wear rate, the second rotational element wears at a second wear rate and the first wear rate and the second wear rate are not equal; and wherein the modulus of the first material is selected proportional to the first wear rate and the modulus of the second material is selected proportional to the second wear rate.

11. The device of claim 10, wherein the first speed and the second speed are different.

12. The device of claim 10, wherein the first rotational element and the second rotational element are configured as gears.

13. The device of claim 10, wherein the first material and the second material are different.

14. The device of claim 10, wherein the first cycle period is higher than the second cycle period, and the first material is selected for a modulus that is higher than the second material.

15. The device of claim 14, wherein the modulus is selected for a low contact stress at the hybrid material interface.

16. The device of claim 14, wherein the device is configured as a traction drive.

17. The device of claim 10, wherein the device is configured such that the first rotational element and the second rotational element wear an approximately symmetric amount.

18. The device of claim 10, wherein the first surface and the second surface are configured to engage without lubrication.

19. The device of claim 10, wherein the first surface is comprised of a third material that is harder than the first material.

20. The device of claim 19, wherein the third material is an oxide or ceramic.

21. The device of claim 20, wherein the oxide is formed by heating the first rotational element to around a glass transition temperature of the first material.

* * * * *